United States Patent [19]
Zweigart

[11] Patent Number: 5,035,461
[45] Date of Patent: Jul. 30, 1991

[54] FOLDING TOP FOR VEHICLES AND METHOD OF FOLDING

[75] Inventor: Gerhard Zweigart, Aidlingen, Fed. Rep. of Germany

[73] Assignee: Daimler-Benz Aktiengesellschaft, Fed. Rep. of Germany

[21] Appl. No.: 523,880

[22] Filed: May 16, 1990

[30] Foreign Application Priority Data

May 16, 1989 [DE] Fed. Rep. of Germany ....... 3915867

[51] Int. Cl.⁵ ............................................... B60J 7/08
[52] U.S. Cl. ..................................... 296/107; 296/124
[58] Field of Search ............... 296/107, 116, 124, 136; 280/756

[56] References Cited

U.S. PATENT DOCUMENTS

| | | | |
|---|---|---|---|
| 1,190,890 | 7/1916 | Hanaur | 296/116 |
| 2,185,581 | 1/1940 | Bessonneau | 296/136 |
| 2,592,512 | 4/1952 | Fodermaier | 296/116 |
| 4,557,502 | 10/1985 | Scaduto et al. | 280/756 |
| 4,830,402 | 5/1989 | Matthias et al. | 280/756 |

FOREIGN PATENT DOCUMENTS

2207099 1/1989 United Kingdom ............... 296/116

Primary Examiner—Margaret A. Focarino
Assistant Examiner—Gary C. Hoge
Attorney, Agent, or Firm—Evenson, Wands, Edwards, Lenahan & McKeown

[57] ABSTRACT

A vehicle folding top is stowed in an associated generally U-shaped folding-top box when the folding top is opened. The folding-top covering held by a folding-top structure is, during the lowering of the folding top, drawn into the folding-top box while, at the same time, run on a directing edge at the upper margin of a limiting wall of the folding top box. The directing edge extends over a middle wall and over a part length of the side walls of the folding-top box and is softened by rounding edges which merge into the wall surfaces. To allow the folding-top covering to be inserted into the folding-top box with a minimum of wear, an additional directing contour is provided above the box and comprises, at its upper margin, a run-on edge set back relative to the directing edge of the folding-top box and a sliding surface located between the directing edge and the run-on edge.

1 Claim, 2 Drawing Sheets

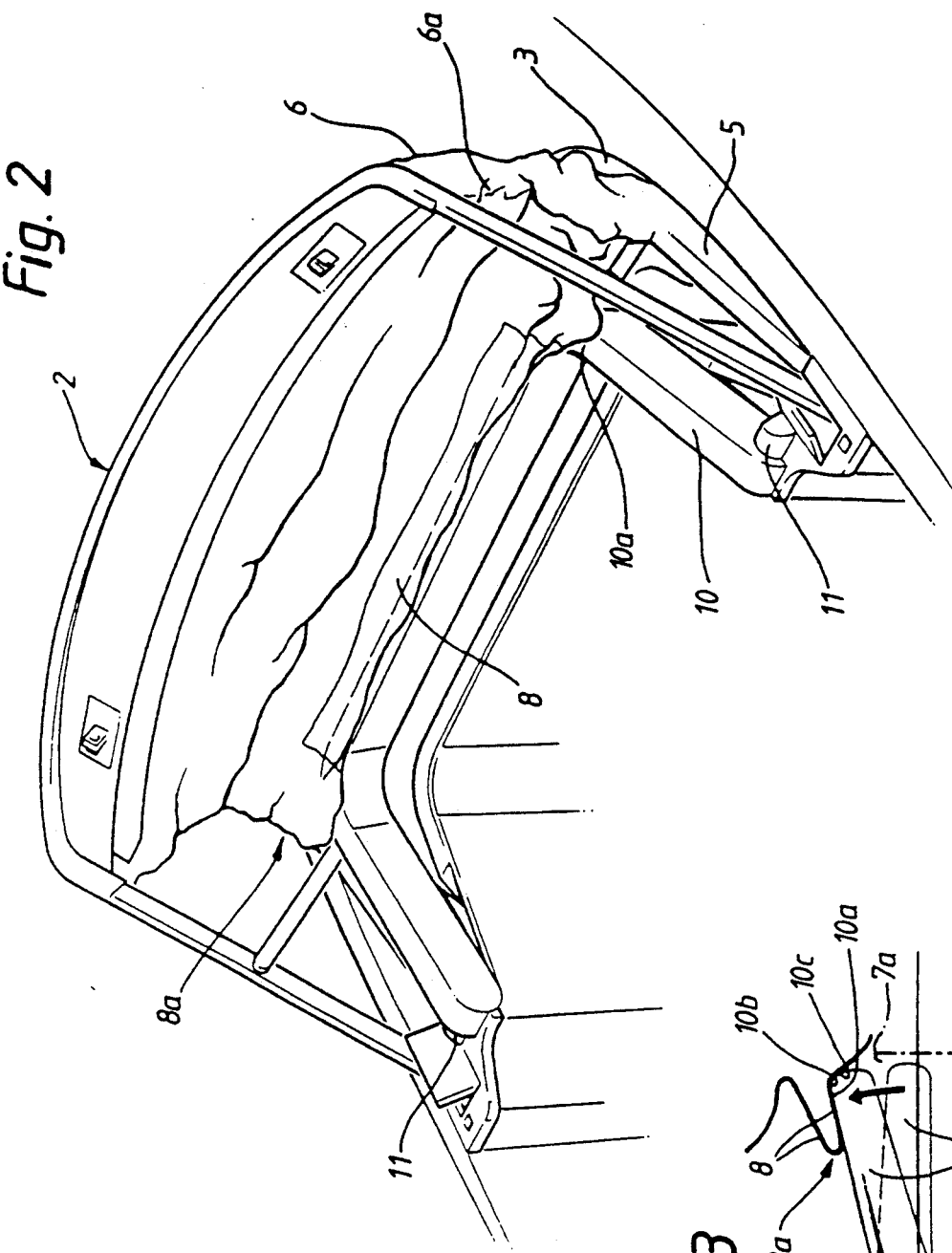

FOLDING TOP FOR VEHICLES AND METHOD OF FOLDING

BACKGROUND AND SUMMARY OF THE INVENTION

The present invention relates to a folding top for vehicles and folding method, wherein the top is stowed in an associate folding-top box when the folding top is stored and, more particularly, to a vehicle folding top and method in which a folding top covering is, during lowering of the top, drawn into the box and, at the same time, run on a directing edge at the upper margin of a limiting wall of the box.

Folding tops are generally known as shown, for example, in German Patent Specification 3,724,533. The rear-wall region of this folding top is made relatively long for aerodynamic reasons and has a correspondingly large-size, flexible plastic rear window and corner windows arranged laterally relative to the rear window. A folding top covering of this known folding top is held, underneath the windows, continuously by a U-shaped fabric-holding bar and, above the rear window, by a corner bow fastened pivotably to the fabric-holding bar. In order to lower the folding top into an associated folding-top box, the fabric-holding bar first has to be swung up into an erected intermediate position, after which it is located in a width plane lying behind the erect main bow. Since the corner bow comes into the width plane of the fabric-holding bar when the latter is swung up, this necessarily produces a large round-bending fold, the bending axis of which extends in the width direction of the vehicle and arches rearwardly out of the plane of the fabric-holding bar. This round-bending fold is maintained virtually unchanged during the lowering operation of the folding top, until the folding-top box orifice is reached, because the pivoting position of the fabric-holding bar no longer changes in relation to the main bow during the joint backward pivoting movement of these components. To obtain a good utilization of the constructional space of the convertible, the folding-top box and therefore also the folding-top box orifice are of relatively narrow cross-section. Because of this, the round-bending fold stiffened over its surface by the windows cannot enter the folding-top box orifice without contact, but instead runs onto the front limiting wall of the folding-top box, with the result that its projecting length of approximately 10 cm is drawn into the folding-top box only when the fabric-holding bar has been lowered.

In order to prevent damage to the folding-top covering during the lowering operation, the upper margin of the front limiting wall of folding-top boxes of conventional design is "softened" by rounding a directing edge which merges into the wall surface of the front limiting wall. As a result of the stiffening effect of the windows, in conjunction with the virtually right-angled transitions between the middle region and the lateral wall surfaces of the front limiting wall of the folding-top box, however, there is a danger, when the folding top is drawn beyond the directing edge, that sharp kink folds will form in the rear-wall region of the folding-top covering. Such kink folds constitute permanent deformation which has a persistent adverse effect on the appearance of the windows even after only a few actuating cycles of the folding top. Moreover, kink folds influence the bending behavior of the windows and are conducive to further surface damage to the scratch sensitive plastic windows.

An object of the present invention is an improvement of the insertion behavior and method of a folding top of the aforementioned type into a correspondingly narrow folding-top box, so that formation of sharp kink folds in a rear-wall region of the folding-top covering stiffened over its surface can be prevented.

The foregoing object has been achieved by providing a raised additionally directing contour prior to the directing edge of the folding-top box. The round-bending fold thereby already runs on in an earlier phase of the backward pivoting movement of the fabric-holding bar, with the result that the running-on underside of the round bending fold is bent at an obtuse angle with a consequent flattening of the round-bending fold. At the same time, the obtuse angle of the bend is determined by a supporting surface located in front of the run-on edge and by a sliding surface of the directing contour which, starting from the run-on edge, extends obliquely downwards in the drawing direction of the fabric-holding bar.

In one embodiment, the additional directing contour can consist of a body part itself or of a built-on part connected firmly to the body and made of plastic or the like. In an alternative embodiment, the directing contour can be formed by the circumferential contour of a pivotable bar which extends along the U-shaped front folding-top box limiting wall and which, in a position of rest, is arranged at or below the level of the folding-top box lid. This alternative embodiment is particularly desirable when there is already arranged in front of the folding-top box a roll bar which can be swung up out of a lowered position of rest into an erected protective position. When the roll bar lays in its rest position essentially flush with the upper edge of the closed folding-top box lid, it can perform the directing function if it projects sufficiently far beyond the directing edge of the folding-top box. Otherwise, there can be a partially swung-up intermediate position of the roll bar which it has the necessary height advantage. By the use of appropriate control elements, a motor drive present for the roll bar can also be used for allowing the roll bar to assume the intermediate position, so as to minimize extra outlays.

BRIEF DESCRIPTION OF THE DRAWINGS

These and other objects, features and advantages of the present invention will become apparent from the following detailed description of a presently preferred embodiment when taken in conjunction with the accompanying drawings wherein:

FIG. 2 is a perspective top view of the opened folding-top box in accordance with the present invention, with the folding top lowered almost completely; and FIG. 3 is a diagrammatical representation of the run-on action of a round-bending fold of the folding-top covering in accordance with the present invention.

DETAILED DESCRIPTION OF THE DRAWINGS

Figure 1:
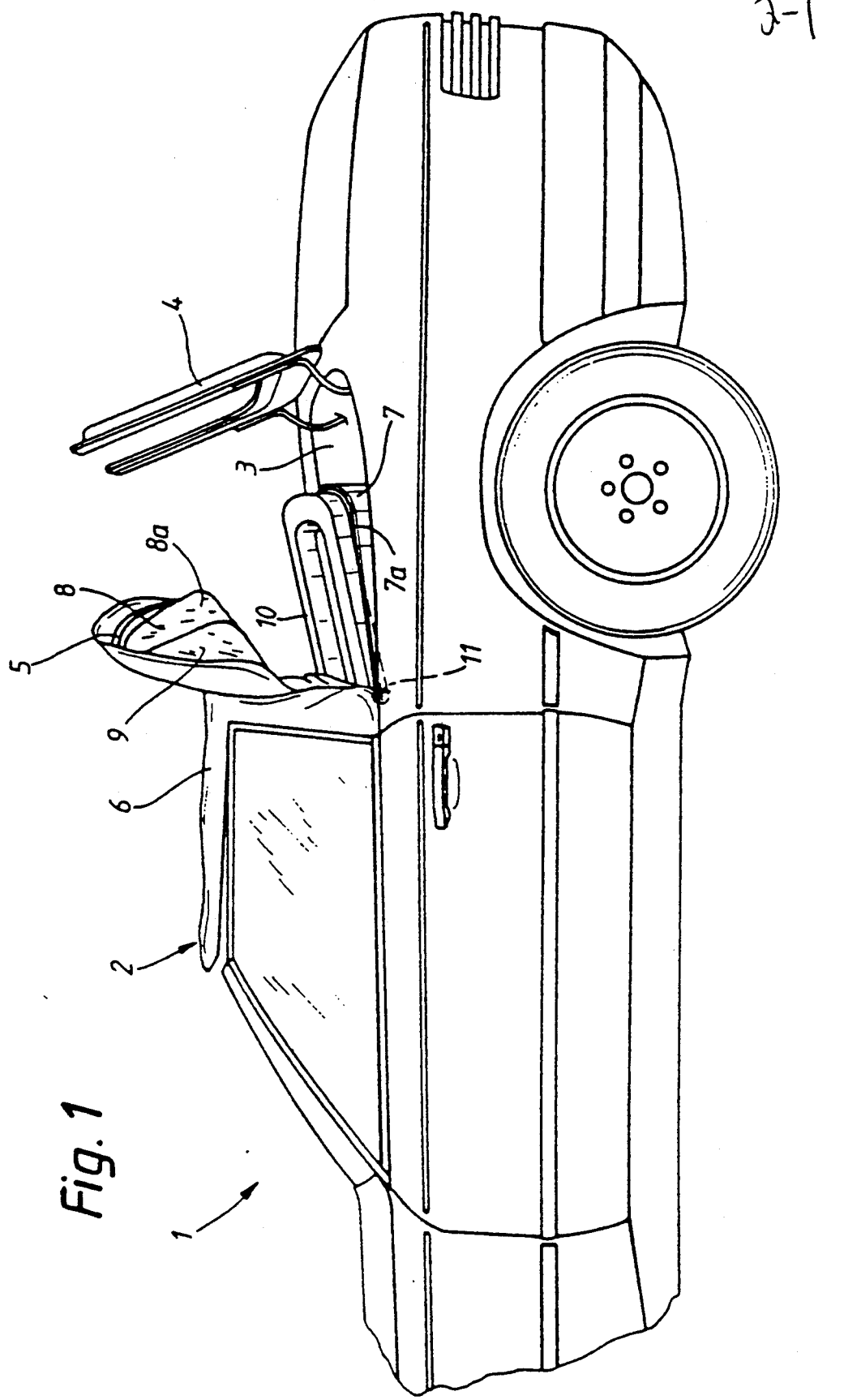
FIG. 1 is a perspective side view of a convertible equipped with the present invention during a first phase of the opening operation.

A convertible vehicle 1 has a folding top 2 which, in order to open the roof, can be lowered into a generally U-shaped folding-top box 3 in the body surrounding a vehicle rear-seat region. The folding-top box 3 has an orifice which faces upwards and which can be covered by means of a folding-top box lid 4 fastened pivotably to the body behind the folding-top box 3. With the folding top 2 closed, a U-shaped fabric-holding bar 5 rests on the lid and is fastened in a known way oppositely on the lateral folding-top columns of a main bow of the folding top 2.

To open the folding-top box lid 4 in order to lower the folding top 2, the fabric-holding bar 5 first has to be pivoted forwards into an erected intermediate position as can be seen in FIG. 1. In this intermediate position, the bar 5 is in almost vertical position behind the transverse plane of the convertible 1 spanned by the main bow. The lateral legs of the fabric-holding bar 5 are relatively long and project substantially beyond the main bow. A rear-wall region of a folding-top covering 6 of the folding top 2 surrounded by the fabric-holding bar 5 is made to an appropriately large-size and also has window-orifices, into which a large rear window 8 and lateral triangular, transparent plastic windows 9 are stitched. The lower edge of the rectangular rear window 8 reaches virtually as far as the fabric-holding bar 5, and the folding-top covering 6 is held along an upper edge of the rear window 8 by a corner bow (not visible) which, with a U-shaped length extension, spans the width or transverse distance between the lateral legs of the fabric-holding bar 5 and is articulated at the end of each of its flanks on the respective associated leg of the fabric-holding bar 5. When the fabric-holding bar 5 is raised, the corner bow is therefore transferred into the width plane of the fabric-holding bar 5, its approximately horizontally extending middle region being somewhat lower than the level of the roof surface of the closed folding top 2, after the intermediate position of the fabric-holding bar 5 shown in FIG. 1 is reached.

The reduction of the distance between the middle regions of the corner bow, taking place during the operation of pivoting the latter into the plane spanned by the fabric-holding bar 5, necessarily causes a folding of the rear-wall region stretched between them. Because the rear window 8 exerts a stiffening effect over a wide surface, a larger round-bending fold 8a is thus produced approximately in the center. The round-bending fold 8a has a bending axis extending horizontally in the width direction of the convertible vehicle 1 and, when the fabric holding bar is erect, arches rearwardly.

The actual lowering operation can begin after the front folding-top fastenings have been released. The main bow is pivoted rearwardly through approximately 90° in a known manner. Since the relative pivoting position of the fabric-holding bar 5 in relation to the main bow does not change as a result of the rearward pivoting of the latter, the round-bending fold 8a also remains virtually unchanged. As a consequence of the arrangement of the folding top box 3, a front or inner limiting wall 7 of the box 3 is located relatively far to the rear. The round-bending fold 8a therefore cannot enter without contact, ahead of the fabric-holding bar 5, but projects approximately 100 mm forwards beyond the middle region of the front limiting wall 7. The associated run-on action of the round-bending fold 8a holds back the fold 8a, now the fabric-holding 5 enters the folding-top box 3 and draws the round-bending fold 8a down behind it into the folding top box 3. In order, at the same time, to prevent damage to the rear-wall region of the folding-top covering 6, especially the rear window 8 or the corner windows 9, the upper edge of the limiting wall 7 constitutes a directing edge 7a, that is to say it is "softened" in a conventional way by means of a forwardly and downwardly curved edging of the limiting wall 7. The directing edge 7a extends over the entire length of the limiting wall 7, that is to say also over its lateral length portions, where it is edged correspondingly towards the middle of the vehicle.

A known type of generally U-shaped roll bar 10 is arranged along the inner circumference of the limiting wall 7. The roll bar 10 is mounted at the ends of its lateral legs, in the region near the folding-top columns of the main bow, pivotably about a horizontal axis 11 extending in the width direction of the convertible vehicle 1. The bar 10 is erected automatically through a motor drive if the convertible vehicle 1 overturns by being swung up through 90° about the axis 11. Furthermore, the bar 10 can also be raised out of its lowered stowage position into the erected protective position electrohydraulically at the press of a switch.

In contrast to the previously known functions of the roll bar 10, in the present case there is an intermediate position of the roll bar 10 which is activated automatically likewise at the press of a button or during the operating of lowering the folding top 2 and in which the roll bar 10 offers an additional directing contour for the round-bending fold 8a. In this intermediate position shown in FIG. 2, the lower edge of the middle region of the bar 10 is located approximately level with the directing edge 7a. Since the roll bar 10 has, as seen in the cross-section, rectangular thick upholstery, its upper edge is therefore located considerably above the level of the folding-top box 3.

As can also be seen from FIG. 2, the round-bending fold 8a, after running on the roll bar 10, is held back until the folding top 2 is lowered substantially completely. At the same time, the fold 8a covers virtually completely, in the middle region and corner region of the roll bar 10, an upwardly facing supporting surface 10a which is formed by the front circumferential surface of the roll bar 10. However, the fold arrangement of the folding-top covering 6 is distorted by a soft inner lining 6a which lies in creases.

A diagrammatic side view of the round-bending fold 8a, without the inner lining 6a, can therefore be seen in FIG. 3 where the round-bending fold 8a has flattened during the operation of setting it down, but because of the rear window 8 acting as a surface stiffening, a narrower, yet kink-free bending radius is maintained. This flattening has occurred because the downwardly-turned arching face of the round-bending fold 8a has first come up against a run-on edge 10b which is formed by the most raised circumferential edge of the roll bar 10 in its directing position and which constitutes a transitional rounding between the supporting surface 10a and a sliding surface 10c extending at an obtuse angle relative to this, as seen in cross-section. The sliding surface 10c is provided by a surface portion of the outer circumference of the convexly rounded roll bar 10 which faces the orifice of the folding-top box 3.

After the arching face of the round-bending fold 8a has been set down, the fold 8a is first laid on the supporting surface 10a in the manner illustrated in FIG. 3, and is thus protectively prevented from participating in a further pivoting advance of the structured parts holding the rear-wall region. If there were a stiffer round-bending fold 8a, the illustrated large-size supporting surface 10a could also be replaced by a narrower supporting surface which would be assigned to the run-on edge 10b. It would be possible, for example, for the run-on edge 10b to be constructed comparably to the directing edge 7a. If the round-bending fold 8a were formed from stiffer surface material, the lower arching face of the latter would in any case not remain lying over its surface on the supporting surface 10a, but during the further advance of the fabric-holding bar 5 would tilt about the run-on edge 10b.

In the illustrated embodiment, however, the round-bending fold 8a is held laid over its surface on the supporting surface 10a, until the fabric-holding bar 5 exerts tension forces on the lower width portion of the arching face looped around the directing contour. Under the influence of the tension forces exerted via the fabric-holding bar 5, the round-bending fold 8a is gradually drawn down into the folding-top box 3, the narrow bending radius of the round-bending fold 8a shifting continuously and at the same time passing through the height of the upper arching face. The narrow bending radius is, therefore, propagated in an undulatory manner, so that there is a controlled rolling movement of the round-bending fold 8a, during which no kinks can occur in the rear window 8. After the folding top 2 is lowered completely, the folding-top box lid 4 can be swung down and the roll bar 10 moved back into its lowered position of rest.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A method for selectively stowing a vehicle folding top in a generally U-shaped folding-top box, comprising the steps of opening a lid of the folding-top box arranged in a vehicle;

forming a large round-bending fold in the center of a rear wall region of the folding top with a bending axis extending substantially horizontally in a width direction of the vehicle;

drawing the round-bending fold into the folding-top box;

running the round-bending fold on a roll bar whose upper edge is located substantially above the level of the folding-top box in an intermediate position of the roll bar between a rest position and an erected protective position; and running the round-bending fold on a directing edge which extends over a middle wall and portion of side walls of the folding-top box.

* * * * *